Patented Nov. 22, 1927.

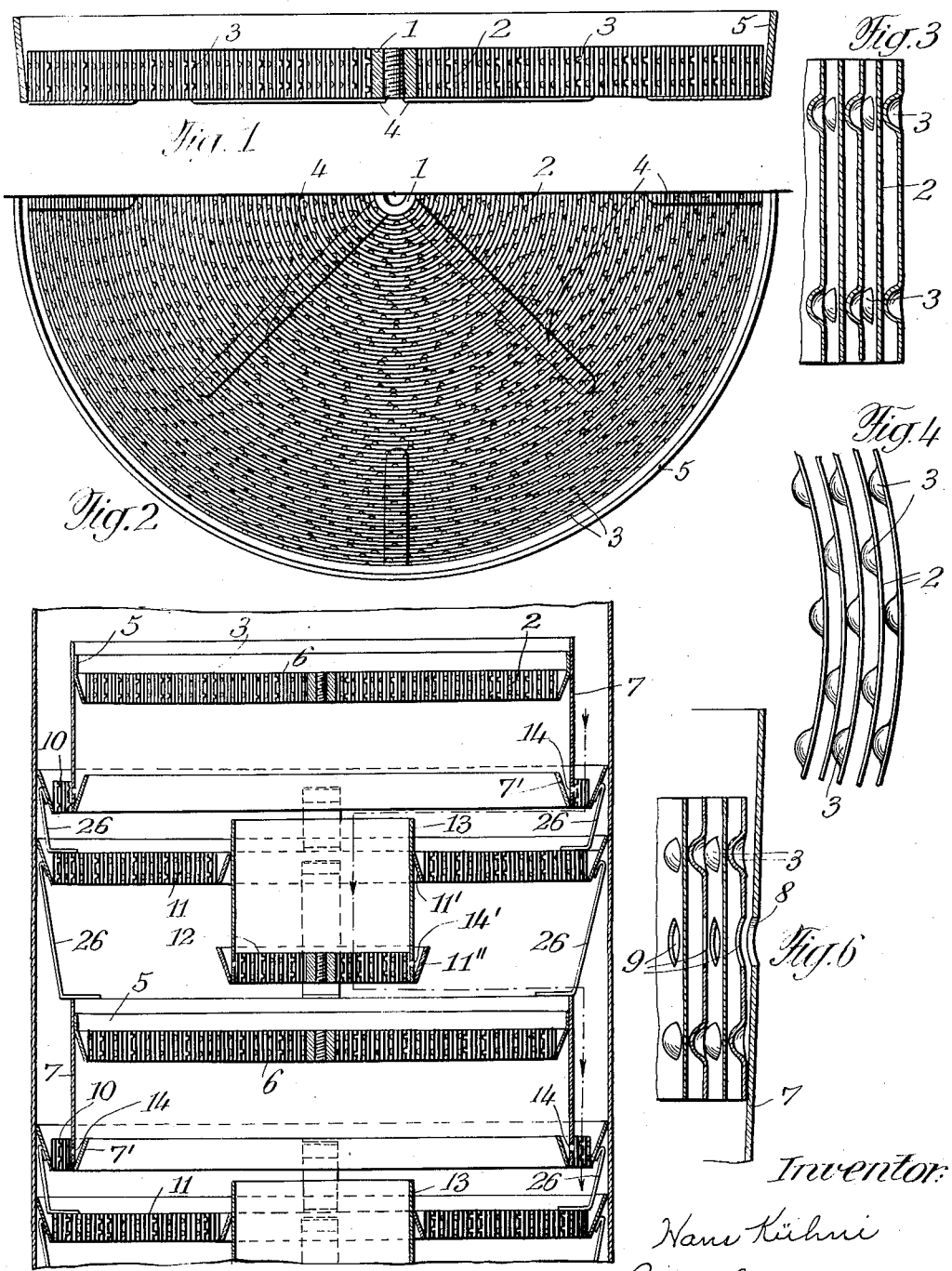

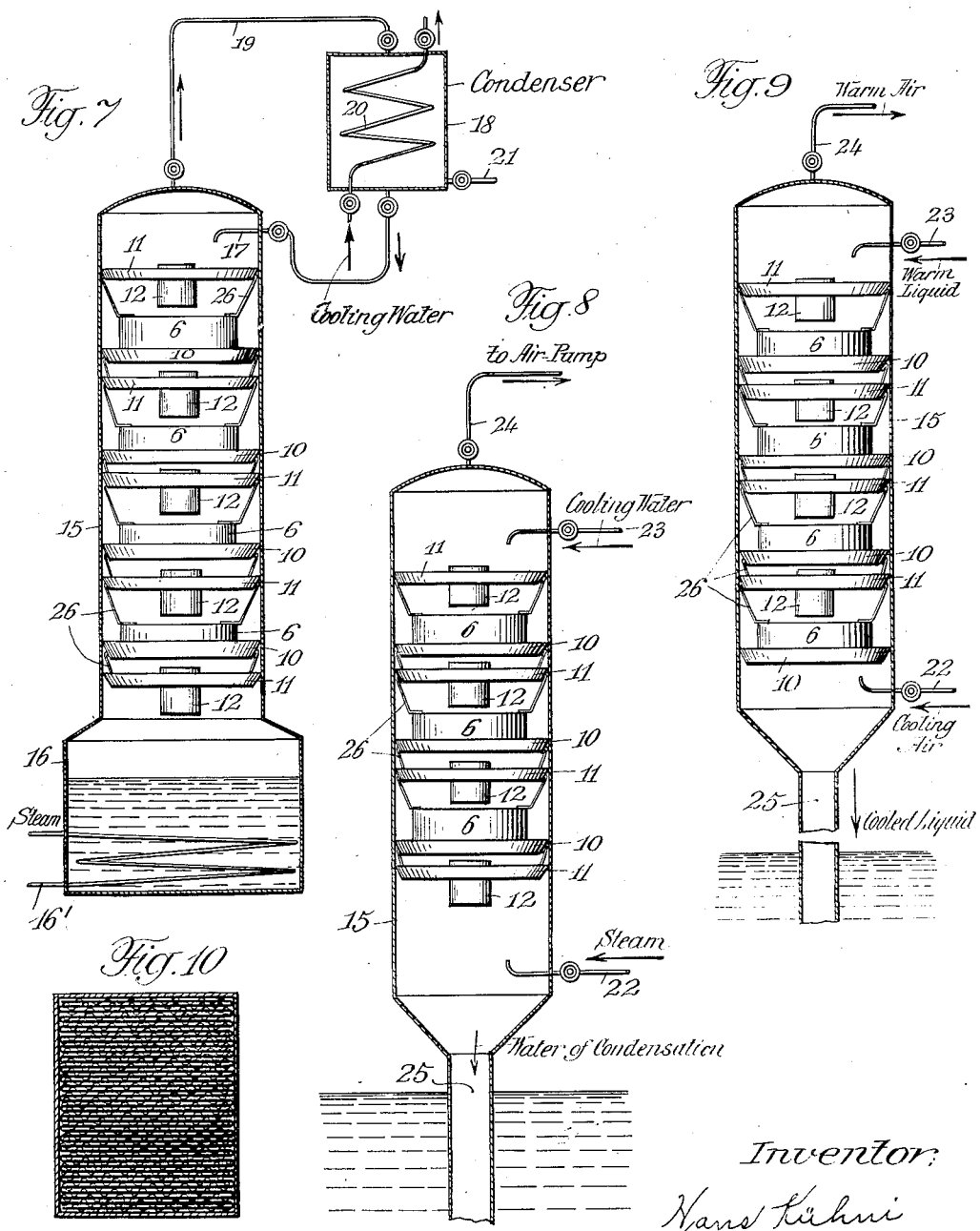

1,650,140

UNITED STATES PATENT OFFICE.

HANS KÜHNI, OF RUMLANG, SWITZERLAND, ASSIGNOR, BY MESNE ASSIGNMENTS, TO AIR REDUCTION COMPANY, INCORPORATED, A CORPORATION OF NEW YORK.

HEAT-INTERCHANGE DEVICE.

Application filed November 13, 1922, Serial No. 600,514, and in Switzerland November 25, 1921.

The present invention relates to improvements in heat interchange devices and has for its object to provide an element for devices of this kind that is equally suitable for evaporation, condensation and distillation purposes.

When distilling liquids the boiling temperatures of the constituent parts of which are very close to each other it is difficult to provide for the necessary surfaces which ensure a complete equalization of the temperatures of the vapours and liquids without having recourse to extremely high columns with which the influence of the temperature difference against the surrounding air is of an increased importance. An efficient distilling column must have an effective surface that is as large as possible whilst being of small dimensions and utilizing a low velocity of the vapours.

When products of a pureness of 95–100% have to be distilled the boiling points of the product to be treated and of the distilled product differ only by some hundredth of a degree thus necessitating undesirable high columns when utilizing the known baffle plates or grids. Liquid nitrogen of a pureness of 90% has, for instance, a boiling point of 194° C. below zero and liquid nitrogen of pureness of 100% has a boiling point of 194,46° C. below zero. The thermal conductivity of the liquids and gases is very small for such small differences in temperature, i. e. the conditions for the transmission of heat within the liquids and gases are unfavorable and the temperature difference acts only on the superficial layers which are in direct contact with each other. This contacting surface has therefore to be made as large as possible or in other words an extremely fine distribution of vapour and liquid has to be attained.

In cooling apparatus baffles are known that consist of metal bands wound in a spiral manner and various proposals have been made to keep the layers of the wound metal band at suitable distances from each other, for instance by the aid of screw bolts, by providing the strap with raised portions by a pressing process and the like. The manner of operation of such cooling devices necessitates a mechanical movement in order to alternately moisten the wound plates or their surfaces respectively and to let the gas current pass. The heat interchange obtained by cooling devices of this type is not perfect, only a mixing temperature is reached.

In order to obtain a perfect exchange of heat the counter-current principle has to be adopted as is the case with counter-current condensers, counter-current coolers and with the distilling apparatus.

The heat exchange element according to the present invention is a body arranged in a counterflow apparatus and which responds to the aforementioned requirements. The element may be described as a metallic sponge and its cross-section shows such a number of surfaces or plates arranged beside each other that the adhesion suffices to hold liquid in the interstices, so that the gas current has to pass through a liquid seal. The distance from one surface of the metal to the next surface is equal to or smaller than the dimension determined by the viscosity of the liquid to be utilized. These closely spaced plates may be formed conveniently by winding a metallic strip in a spiral manner. Other arrangements of plates are obviously within the scope of the invention. The elements thus formed are placed in superimposed relation so that the gases may pass through them successively and through the liquid supported thereon.

Several constructional examples of the invention are illustrated on the accompanying drawings, in which:

Fig. 1 is a vertical axial section through a first constructional example and

Fig. 2 is a plan view of Fig. 1;

Figs. 3 and 4 show details on an enlarged scale,

Fig. 5 illustrates a second constructional example in a vertical axial section,

Fig. 6 shows a modification of a detail,

Fig. 7 shows a vertical section through a distilling apparatus embodying the elements according to the invention, Fig. 8 is a vertical section through a counter-current mixing condenser. and Fig. 9 is a vertical section through a counter-current cooling apparatus utilizing the elements according to the invention.

Fig. 10 shows a modification in the arrangement of the metal band out of which an element is formed.

Referring now to the constructional example illustrated in Figs. 1 and 2, a metal band or tape 2 is wound on a central bushing 1 in a spiral manner. The band 2 has button-like projections 3 at suitable intervals in its upper and lower parts which rest against the next winding so that the adjacent windings are kept at determined distances from each other. The projections 3 are of such a height that the distance between two adjacent windings of the metal strip corresponds to the viscosity of the liquid to be treated i. e. the distance is such that the liquid owing to its viscosity remains suspended between the individual windings of the coil. The windings of the coil are kept in their position by solder 4. The solder extends in the radial direction from the center of the element thus formed, other solder extends radially from the circumference of the element and care has to be taken that as little of the operative surface of the element as possible is covered by the solder. A conical wall 5 serving to bank up the liquid is provided on the outer circumference of the element.

Figs. 3 and 4 illustrate the manner in which the individual windings of the coil are kept at the desired distance from each other by means of the elevations 3. After a baffle element has been arranged in a column the liquid supplied from above automatically remains adhering to the element or grid on account of its viscosity. The upward flowing gas forces its way between the layers and thereby comes into intimate contact with the liquid.

As the efficient working of the baffle also depends on the contacting surface between gas and liquid the efficiency of an element according to the present invention is considerably greater than that of a perforated baffle. The surface area of the metallic coil according to the constructional form illustrated in Figs. 1 and 2 amounts to at least twelve times the total surface area of the perforations of a perforated baffle, on this fact depends a considerable increase in the efficient working, moreover the height of the liquid column above the baffle through which liquid the gas has to pass has an important influence on the contact effect between gas and liquid and therefore on the efficiency obtained.

The spacing of the layers formed by the metallic band may also be obtained by winding the metallic band simultaneously with a strip of paper or cardboard. The windings of the metallic band will then be fixed in their relative positions by soldering the individual windings together at certain places, whereupon the paper is removed.

Instead of winding the metallic band in a spiral manner the element might be formed by a metallic band folded in zig-zag lines which arrangement is advantageous when the outer shape of the element is rectangular as is shown in Fig. 10. The metallic band is in this case preferably provided on both sides with projections to space the adjacent folds of the band from one another.

The heat exchange element illustrated in Fig. 5 consists of two parts and a plurality of elements are shown arranged to form a column.

The uppermost baffle in Fig. 5 comprises an inner part 6 provided with an outer wall 7 that is higher than the upper edge of the part 6. The wall 7 may, as shown in the modification, Fig. 6, be provided with a plurality of holes 8 and the outer windings of the metal band 2 are provided with a plurality of holes 9 which render it possible that the liquid adhering between the windings can pass through the holes 8 and 9. Outside of and below the part 6 an annular baffle 10 is provided which also consists of a plurality of layers the distance between which is determined by the viscosity of the liquid to be utilized. Below the baffle element consisting of the two parts 6 and 10 a further element consisting of the two parts 11 and 12 is arranged in the column. The annular part 11 of the element is at a higher elevation than the center part 12, a cylindrical wall 13 is provided separating the parts 11 and 12. The upper edge of the wall 13 is higher than the top of the windings of the annular part 11.

In order to catch liquid escaping between the outer conical ring 5 and the outermost winding of the part 6 a conical ring 7' is fixed to the inner side of the wall 7 and the liquid collecting in the trough formed by the conical ring 7' and the wall 7 is conducted into the element part 10 by means of holes 14 in the wall 7. For the same purpose a conical ring 11'' is provided on the outside of the cylinder 13 vertically below the conical ring 11' and holes 14' in the cylindrical walls 13 provide a passage for the liquid collecting in the trough formed by the walls 13 and 11'' through which it may pass into the element part 12.

The vertical spacing of the elements 6, 10 and 11, 12 from each other is secured by the distance pieces 26.

The liquid stands on the baffles 6 and 11 partly as liquid and partly as froth to the height of the walls 7 and 13, but these walls also act as overflow crest. The liquid leaving the parts 6 and 10 of the uppermost element on its underside is received by the following lower element 11, 12 and adheres to this element.

The distance between the adjacent layers 2 may also be made smaller than the distance which corresponds to the viscosity of the liquid to be used whereby the heat interchange effect of the element can be further increased.

Fig. 7 illustrates a distilling apparatus in which a plurality of elements 6, 10 and 11, 12 of the type shown in Fig. 5 are arranged in a column inside a cylindrical receptacle 15. The liquid to be treated is contained in the receptacle 16 and is heated by means of the steam coil 16'. The vapours emanating from the heated liquid rise and pass through the elements 6, 10 and 11, 12. The liquid adhering to the elements consists of the condensed distilled liquid supplied by the pipe 17 from a condenser 18 to which the vapours leaving the column are led by means of a pipe 19. 20 is a coil in which cooling water for condensing purposes circulates and 21 designates a pipe to draw off the distilled product.

In the counterflow mixing condenser illustrated in Fig. 8 the column inside the receptacle consists of a plurality of elements 6, 10 and 11, 12. The steam to be condensed is supplied by a pipe 22 arranged in the lower part of the receptacle 15 and the cooling water is introduced into the condenser through a pipe 23 situated above the baffle elements.

The pipe 24 leads to an air pump and the water of condensation leaves the apparatus by the pipe 25 provided at the lower extremity of the receptacle 15.

The counter-flow cooling apparatus illustrated in Fig. 9 corresponds to the counterflow-mixing-condenser shown in Fig. 8. Cooling air is supplied by the pipe 22 and the warm liquid to be cooled enters by the pipe 23. The heated air leaves the apparatus through the pipe 24 and the cooled liquid through the pipe 25.

A heat exchange apparatus utilizing the elements according to the present invention has a three to five times greater effective area or film surface per cubic content of the column than the hitherto known apparatus, the output of the apparatus is increased correspondingly. Several specific embodiments of the invention have been described and it should be understood that the windings may include plates spaced from each other so as to accomplish the purpose of the invention.

I claim:

1. An element for evaporating, condensing and distilling apparatus, comprising a spirally wound sheet metal strip, with spaced convolutions, the spacing of the convolutions being sufficiently small to maintain a liquid between the spiral turns and to prevent the passage of liquid through the element.

2. A heat interchange element comprising a center part consisting of a plurality of spaced low plates standing upright, and an annular part surrounding said center part and consisting of a further plurality of low plates standing upright, said two parts being arranged at different elevations and the maximum distance between adjacent plates being such that the liquid is able to adhere to said plates and fill up the interstices between the plates through which a gaseous medium has to pass.

3. A heat interchange element comprising a center part consisting of a plurality of low plates standing upright and obtained by winding a band of sheet metal in a spiral fashion, an annular part surrounding said center part and consisting of a further plurality of low plates standing upright and obtained by winding a band of sheet metal in a spiral fashion, said two parts being arranged at different elevations and the distance between adjacent windings being such that the liquid is able to adhere to said windings and fill up the interstices between adjacent windings through which a gaseous medium has to pass, and a separating member interposed between said two parts, the upper edge of said member being at a higher elevation than the uppermost of said two parts and acting as an overflow crest for the liquid passing from one of said parts to the other.

4. A heat interchange element comprising a center part consisting of a plurality of low plates standing upright and obtained by winding a band of sheet metal in a spiral fashion, an annular part surrounding said center part and consisting of a further plurality of low plates standing upright and obtained by winding a band of sheet metal in a spiral fashion, said two parts being arranged at different elevations and the maximum distance between the plates being such that the liquid is able to adhere to said windings and fill up the interstices between adjacent windings through which a gaseous medium has to pass, a cylindrical member interposed between said two parts, the upper edge of said member being at a higher elevation than the uppermost of said two parts and acting as an overflow crest for the liquid passing from one of said parts to the other, and a conical ring secured to said cylindrical member at the same elevation as the lower of said parts and vertically below the joint of the other part with said cylindrical member, the trough thus formed being in open connection with the lower of said parts.

5. A heat interchange apparatus of the counterflow type, comprising in combination a receptacle, means arranged in the upper part of said receptacle to supply liquid utilized for heat interchange purposes, means arranged in the lower part of said receptacle to supply a gaseous medium, and a plurality of elements each consisting of a metallic sponge adapted to keep said liquid suspended so that a liquid seal is formed through which said gaseous medium has to pass whereby an intimate contact with the liquid is effected, said elements being arranged one above the other.

6. An apparatus for evaporating, condensing, or distilling, comprising a receptacle, means mounted in said receptacle to support a body of liquid and permit the passage of gas therethrough, said means comprising a series of spaced strips arranged substantially edgewise, the spacing of said strips being sufficiently small to substantially prevent the passage of liquid therethrough while permitting the passage of a gas, and means for admitting a gas to the receptacle below said means.

7. In combination with an evaporating, condensing or distilling apparatus, a tray comprising a series of spaced parallel strips and means carried by said strips for maintaining them in accurate spaced relation, the spaces being sufficiently small to maintain the liquid between the strips and to substantially prevent the passage of the liquid therethrough while permitting the passage of a gas.

8. In an apparatus for evaporating, condensing or distilling, a combination consisting of a permeable tray having a rim commensurate in height to the depth of liquid which it is desired to maintain thereon, means for confining a gas below said tray and in contact therewith, and means for admitting a gas thereto, the said permeable tray comprising a plurality of parallel strips and means on each strip for maintaining it in predetermined spaced relation to an adjacent strip, the spacing being sufficiently small to maintain liquid between the strips and substantially prevent the passage of liquid through the tray while permitting the passage of a gas.

9. An apparatus for evaporating, condensing or distilling, comprising a receptacle, means mounted in said receptacle to support a body of liquid and permit the passage of gas therethrough, said means comprising closely spaced portions of a strip, the spacing of the adjacent portions being sufficiently small to substantially prevent the passage of liquid therethrough while permitting the passage of a gas, and means for admitting a gas to the receptacle below said means.

In testimony whereof I affix my signature.

HANS KÜHNI.